US008930991B2

(12) United States Patent
Philpott et al.

(10) Patent No.: US 8,930,991 B2
(45) Date of Patent: *Jan. 6, 2015

(54) SYSTEM AND METHOD FOR DELIVERING CONTENT TO MOBILE DEVICES

(76) Inventors: Gregory Philpott, Toronto (CA); Indravadan Patel, Toronto (CA)

(*) Notice: Subject to any disclaimer, the term of this patent is extended or adjusted under 35 U.S.C. 154(b) by 81 days.

This patent is subject to a terminal disclaimer.

(21) Appl. No.: 12/949,970

(22) Filed: Nov. 19, 2010

(65) Prior Publication Data

US 2011/0145858 A1  Jun. 16, 2011

Related U.S. Application Data

(60) Provisional application No. 61/262,695, filed on Nov. 19, 2009.

(51) Int. Cl.
| | |
|---|---|
| H04N 7/10 | (2006.01) |
| H04N 7/16 | (2011.01) |
| H04N 7/025 | (2006.01) |
| H04N 7/173 | (2011.01) |
| H04N 21/475 | (2011.01) |
| G06Q 30/02 | (2012.01) |
| H04N 21/414 | (2011.01) |
| H04N 21/422 | (2011.01) |
| H04N 21/458 | (2011.01) |
| H04N 21/658 | (2011.01) |
| H04N 21/81 | (2011.01) |
| H04N 21/858 | (2011.01) |

(52) U.S. Cl.
CPC .......... *H04N 21/4755* (2013.01); *G06Q 30/02* (2013.01); *H04N 21/41407* (2013.01); *H04N 21/42202* (2013.01); *H04N 21/458* (2013.01); *H04N 21/6582* (2013.01); *H04N 21/812* (2013.01); *H04N 21/858* (2013.01)
USPC ................... 725/35; 725/32; 725/34; 725/36; 725/62; 725/86; 725/87; 725/93

(58) Field of Classification Search
None
See application file for complete search history.

(56) References Cited

U.S. PATENT DOCUMENTS

| | | | |
|---|---|---|---|
| 6,792,047 B1 | 9/2004 | Bixby et al. | |
| 7,548,565 B2 | 6/2009 | Sull et al. | |

(Continued)

FOREIGN PATENT DOCUMENTS

| | | |
|---|---|---|
| CA | 2574998 A1 | 2/2006 |
| WO | 2011150293 A1 | 12/2011 |
| WO | 2012074762 A1 | 6/2012 |

OTHER PUBLICATIONS

Related PCT International Application No. PCT/CA2013/000624 International Search Report dated Oct. 18, 2013.

(Continued)

*Primary Examiner* — Nasser Goodarzi
*Assistant Examiner* — Fred Peng
(74) *Attorney, Agent, or Firm* — Fish & Richardson P.C.

(57) ABSTRACT

A system for generating an optimized video including in-stream events for video content and advertising content selected at the time of playback. The system includes a manifest generating module configured to retrieve video content from a content repository for listing in a content manifest in response to a received request from a mobile device, the content manifest including at least one advertisement insertion point. The system further includes an advertising event correlation module configured to retrieve one or more advertisements based on a correlation between advertisement properties and playback properties and an advertisement serving module configured to provide the retrieved one or more advertisement for insertion into the at least one advertisement event insertion point.

23 Claims, 5 Drawing Sheets

(56) References Cited

U.S. PATENT DOCUMENTS

| | | |
|---|---|---|
| 8,145,782 B2 | 3/2012 | McGowan et al. |
| 2004/0158858 A1* | 8/2004 | Paxton et al. ............ 725/42 |
| 2004/0237102 A1* | 11/2004 | Konig et al. ............ 725/36 |
| 2007/0089126 A1 | 4/2007 | Fritz et al. |
| 2007/0220566 A1* | 9/2007 | Ahmad-Taylor ............ 725/89 |
| 2008/0092168 A1 | 4/2008 | Logan et al. |
| 2008/0274752 A1* | 11/2008 | Houri ............ 455/456.1 |
| 2009/0049090 A1* | 2/2009 | Shenfield et al. ............ 707/104.1 |
| 2009/0077580 A1* | 3/2009 | Konig et al. ............ 725/34 |
| 2010/0037204 A1* | 2/2010 | Lin et al. ............ 717/106 |
| 2010/0124907 A1* | 5/2010 | Hull et al. ............ 455/412.1 |
| 2010/0228880 A1 | 9/2010 | Hunt et al. |
| 2011/0265116 A1 | 10/2011 | Stern et al. |
| 2011/0302307 A1* | 12/2011 | Zhong et al. ............ 709/224 |
| 2011/0307623 A1 | 12/2011 | George et al. |
| 2011/0307781 A1 | 12/2011 | Sood et al. |
| 2012/0005313 A1 | 1/2012 | McGowan et al. |
| 2012/0030313 A1 | 2/2012 | McGowan et al. |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047542 A1 | 2/2012 | Lewis et al. |
| 2012/0059721 A1* | 3/2012 | Blegen ............ 705/14.58 |
| 2012/0066285 A1 | 3/2012 | McGowan et al. |
| 2012/0066386 A1 | 3/2012 | McGowan et al. |
| 2012/0072465 A1 | 3/2012 | McGowan et al. |
| 2012/0072541 A1 | 3/2012 | Carls et al. |
| 2012/0072542 A1 | 3/2012 | McGowan |
| 2012/0124624 A1 | 5/2012 | Lau et al. |
| 2012/0185895 A1 | 7/2012 | Wong et al. |
| 2012/0197419 A1 | 8/2012 | Dhruv et al. |
| 2012/0198089 A1 | 8/2012 | Dhruv et al. |
| 2012/0198492 A1 | 8/2012 | Dhruv et al. |
| 2012/0254367 A1 | 10/2012 | McGowan |
| 2012/0259946 A1 | 10/2012 | Stockhammer et al. |
| 2013/0060911 A1 | 3/2013 | Nagaraj et al. |
| 2013/0091251 A1 | 4/2013 | Walker et al. |

OTHER PUBLICATIONS

Related PCT International Application No. PCT/CA2013/000624 Written Opinion of the International Searching Authority dated Oct. 18, 2013.

Related PCT International Application No. PCT/CA2013/000628 International Search Report dated Oct. 29, 2013.

Related PCT International Application No. PCT/CA2013/000628 Written Opinion of the International Searching Authority dated Oct. 29, 2013.

Related U.S. Appl. No. 13/938,816 Notices of References Cited dated Nov. 8, 2013.

* cited by examiner

SYSTEM AND METHOD FOR DELIVERING CONTENT TO MOBILE DEVICES

CROSS REFERENCE TO RELATED APPLICATION

This application claims the benefit of U.S. Provisional Patent No. 61/262,695, filed Nov. 19, 2009, the contents of which are hereby incorporated by reference.

BACKGROUND

The present invention relates generally to the field of streaming content delivery to a mobile device. More particularly, the present invention relates to a system and method for providing in-stream events to a mobile device receiving stream data over a wireless network connection based on information provided by the mobile device.

Video content events may be provided to a wireless network enabled mobile device for playback in any location where a wireless connection is available. The video content events may be chosen from a wide variety of sources and specifically chosen by the user of the device. The video content events may optionally be configured to include overlay interactive content events as further described below. Where a user desires video content event tailored to their particular interests, for example, a tourism video related to their current destination, the user must browser through all of the available video content to find the video specific to their interests.

Video advertising event time, using both traditional media such as television programming and non-traditional media such as mobile devices connected to a wireless network, is typically sold using a standard model. Advertising space is purchased and advertisements are presented along with the feature content as either pre-roll (played before the video programming content, post-roll (played after the video programming content), as interstitials (played at specified periods during one or more breaks in the video programming content), and/or as interactive overlay allowing for content to be display overtop video content during playback.

Further, a sales agreement may not specify the particular time that an advertisement is played. Instead, an agreement between the advertiser and content provider may determine generally when and how frequently the advertisement is presented. The advertiser may further provide a desired audience profile to which the advertisement should be displayed to target the most receptive audience.

Using mobile network devices, the amount of data that is available for determining which advertisement is best suited to a particular viewer has grown significantly. Exemplary data may include detailed user profiles, user location information, user activity histories, user purchasing histories, user location, etc. Any number of advertisements may be appropriate at any given point dependent on the particular selection criteria being implemented and the information that is available.

However, traditional advertising as described above requires regeneration of the programming content that is being streamed over a wireless network. Even when preformatted for advertising, the preformatted content could not be easily adapted for particular advertisements. Requiring regeneration of the content is time intensive and generally not adaptable to rapid changes that may affect the advertisement that should be provided at any given point.

What is needed is a system and method for customizing video content and for providing in-stream event insertion points within the video content to present advertisements. What is further needed to a system and method for allocating a number of advertisements events to an insertion point, where the displayed advertisement will be selected from the advertisement events based on available mobile device information at the time of advertisement display.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

The present invention is directed to a system and method for providing video content including real-time targeted in-stream events to a mobile device connected to the system through a wireless network. Both the content and targeted advertising event is provided based on a determined correlation between advertisement properties and playback properties received by the system from the mobile device at the time the advertising is provided.

One embodiment of the invention relates to a system for generating an optimized video including video content and advertising content selected at the time of playback. The system includes a manifest generating module configured to retrieve video content from a content repository for listing in a content manifest in response to a received request from a mobile device, the content manifest may include at least one advertisement insertion point. The system further includes an advertising event correlation module configured to retrieve one or more advertisement events based on a correlation between advertisement event properties and playback properties and an advertisement event serving module configured to provide the retrieved one or more advertisement event for insertion into the at least one advertisement event insertion point. According to another exemplary embodiment, the video content may further include interactive overlay content.

Another embodiment of the present invention relates to a computer-implemented method for generating an optimized video including video content and advertising content selected at the time of playback. The method includes retrieving video content from a computer-implemented content repository for listing in a content manifest in response to a received request from a mobile device, the content manifest may include at least one advertisement event insertion point. The method further includes retrieving one or more advertisements based on a correlation between advertisement event properties and playback properties, providing the retrieved one or more advertisement event for insertion into the at least one advertisement event insertion point, and transmitting the content manifest of a wireless network to a mobile computing device. According to another exemplary embodiment, the video content may further include interactive overlay events.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
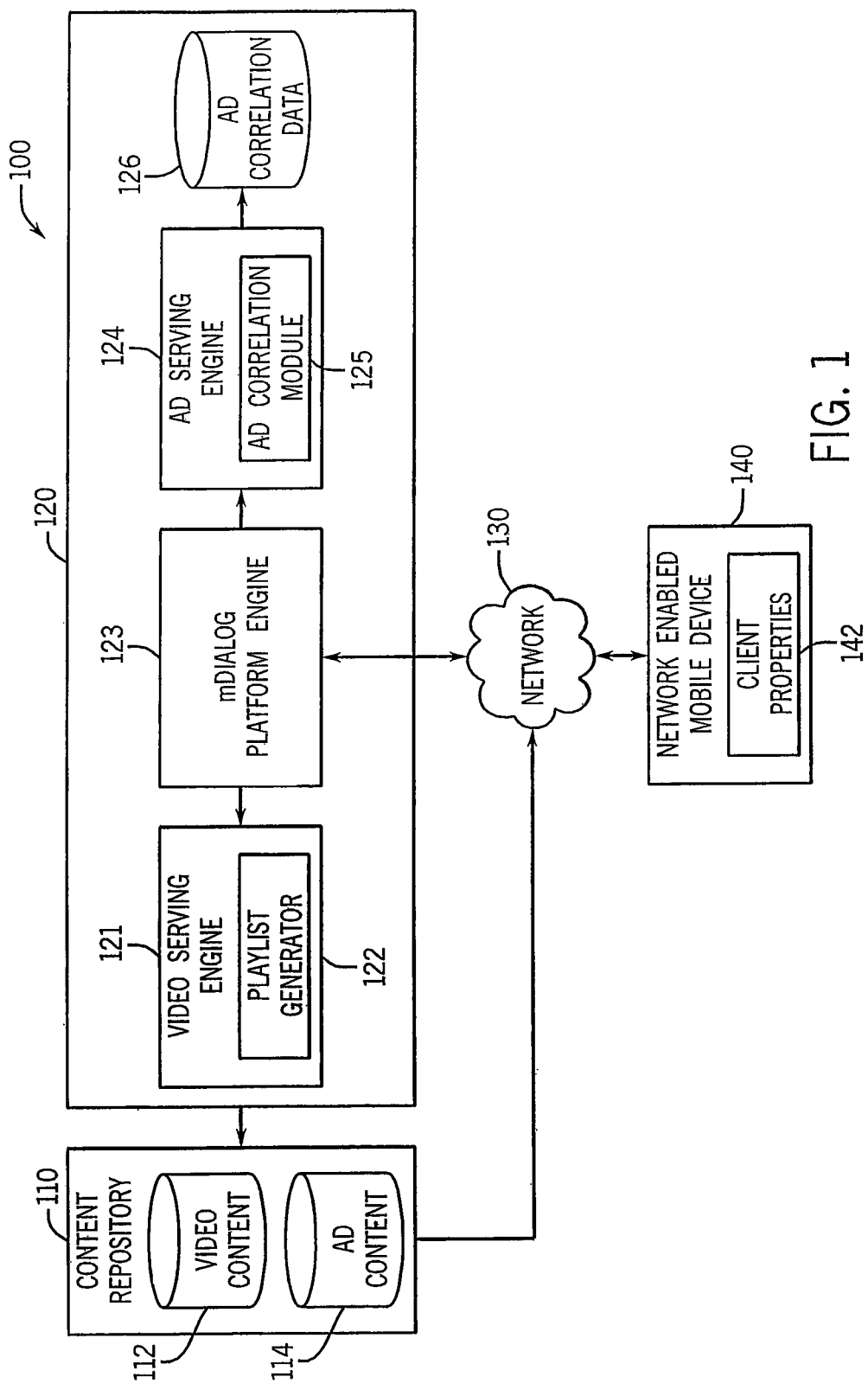
FIG. 1 is a video content delivery system configured to provide advertisement event insertion points in a video content stream, according to an exemplary embodiment.

Before describing in detail the particular improved system and method, it should be observed that the invention includes, but is not limited to, a novel structural combination of conventional video content delivery components and communications hardware and software, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, a video content delivery system 100 configured to provide a video content stream including video content and one or more advertisement event streams provided at designated event insertion points in the video content stream is shown, according to an exemplary embodiment. System 100 includes a content repository 110 and a video content processing system 120. System 100 is configured to provide the video content stream including one or more advertisement event streams over a network 130 to a network enabled mobile device 140. Although shown according to a specific embodiment, system 100 may alternatively be configured to include more, fewer, and/or different components configured to implement functions described herein.

Although advertising events are shown and described in claim 1, system 100 may be configured to use with any type of in-stream event. In-stream events include but are not excluded to video content events, video advertising events and interactive overlay events. Each event provides an opportunity to present the content to the user with temporal relationship to each other.

Content repository 110 may be configured to include a video content database 112 and an advertising content database 114. Each database is configured to store and allow secure retrieval of stored content. Each database may further include one or more fields to be associated with the stored content.

Video content database 112 may be a database configured to store and provide video content for processing and transmission over network 130 by video content processing system 110. The video content may include any type of content such as movies, television programming, user generated content, system-specific content, etc. The stored video content may further include data associated with the video content such as theme information, target audience information, length, format, etc. The stored video content may further include video properties associated with the video content such as target audience, target locations, content length, etc.

Ad content database 114 may be a database configured to store and provide advertising event content for insertion into a video stream generated by system 110. The advertising content may be generated by advertisers and provided to system 100 for insertion into a video stream being transmitted over network 130. The stored advertising content may further include advertisement event properties associated with the advertising content such as target audience, target timeframe, advertisement length, etc.

Video content processing system 120 may be a software application stored on computer readable medium and configured to generate a video stream including video content and one or more advertising stream as will be discussed hereinbelow. Processing system 120 includes a video serving engine 121 having a playlist manifest generator 122, a platform engine 123, an ad event serving engine 124 having an ad event correlation module 125, and an advertisement correlation database 126. Video content processing system 120 may be configured to implement the creation of a video content stream including customized video content and insertion of advertisement events into the advertisement event insertion points of a video stream retrieved from database 112.

Video serving engine 121 is configured to retrieve video content from video content database 112 based on received requests from mobile devices through network 130. The received requests may be based on channel selection, specific video content selections, theme selection, etc. Wherein the selection is a theme selection, a channel selection, multiple selections, etc., manifest generator 122 may be used to maintain a playlist manifest of video content to be successively provided by video serving engine 121. A manifest file provides a video content player with temporal instructions on the content to play back, the method of delivery for the content events, and the location of the content. The manifest file may optionally include additional information to support in-stream overlay event presentation. Manifest generator 122 may be configured to customize the video content to be provided based on information received from the device 140 to which the content will be provided, as described in further detail below.

Platform engine 123 is computer software configured to modify the video content provided by engine 121 to include one or more in-stream event insertion points. According to an exemplary embodiment, the in-stream event insertion points may be configured to be breaks in the video content such that the video content is divided into two or more video content portion to be provided successively with advertising content inserted between video content portions. The in-stream event insertion points may alternatively be implemented by interrupting the provision of video content to provide advertising content. Following provision of the advertising event content, provision of the video content may be resumed. The advertisement event insertion point may also be configured to be at the beginning and/or ending of the video content. Alternatively, the advertising event insertion point may include ads layered over video content (interactive overlay content).

Ad serving engine 124 is configured to retrieve advertising content from advertising content database 114. Ad serving engine 124 includes ad correlation module 125 configured to implement a method for determining which advertising content from advertising content database 114 is to be inserted and provided along with the video content transmitted through network 130 as will be discussed in further detail below. Advertisement correlation database 126 is configured to store and allow retrieval of data allowing ad correlation module 125 to determine the advertising content to be provided. The add correlation module 125 determines the advertisements to be played based on a determined correlation between the advertisement properties and the playback properties of the network enabled mobile device 140 as described below.

Network 130 may be any wireless network configured to allow transmission of information from system 120 to mobile device 140. Exemplary networks may include cellular networks, WiFi networks, or any other type of network for providing information to network enabled mobile device 140.

Network enable mobile device 140 may be any type of device configured to receive and play back video content and display interactive overlay content received over a wireless network device. Exemplary devices may include smartphones, netbooks, laptop computers, tablets, etc. Device 140 may be configured to include a playback properties database 142. Playback properties database 142 may be configured to store and allow retrieval of information related to device 140 for transmission to system 120. Exemplary information may include device information such as identification of the types of video files that can be played on the device, historical usage information, location information (for example, using global positioning data generated by device 140), user information (for example, in a user profile created by the user of device 140), location GPS merged with map location (i.e., retail location, tourist location, etc.), time of day, device screen resolution, device capabilities, device network connection type, device network carrier, device available bandwidth, rate of movement, direction of movement, altitude of movement, location to peer network, transactional data, (for example, to purchase good and services from merchants that are with the proximity of the mobile device), etc.

Figure 2:
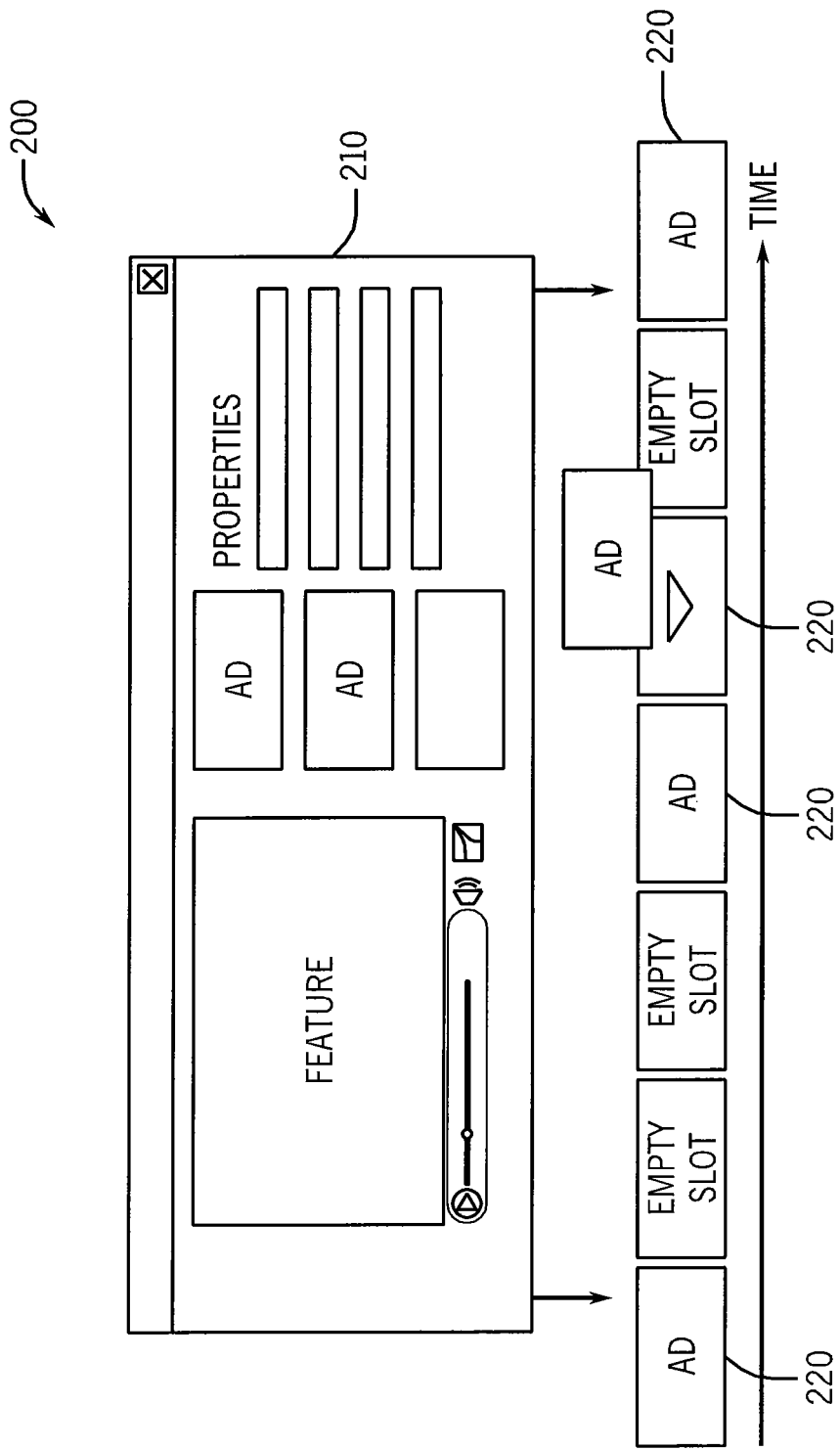
FIG. 2 is a video content playback stream including advertisement insertion points, according to an exemplary embodiment.

Referring to FIG. 2, a video content playback stream 200 including advertisement event insertion points 220 is shown, according to an exemplary embodiment. Stream 200 may be implemented as a graphical user interface 210 allowing a user to drag and drop advertising content and/or video content into one or more insertion points 220. Alternatively, stream 200 may be implemented automatically by video serving engine 121 and/or correlation engine 123 to insert video and/or advertising content into one or more advertisement insertion points 220 in the stream 200 based on video properties, advertisement properties and playback properties as discussed in detail below with reference to FIG. 4.

Alternatively, the advertising content may be provided as interactive overlay content to be displayed contemporaneously with the video content. The interactive overlay content may be configured to be substantially transparent and/or occupy only a portion of a screen so as to minimize interference with the display of the video content. The interactive overlay content may include one or more interactive features where selection of a feature will initiate an advertising process. The advertising process may include, for example display of a web page of an advertiser including directions from the user's current location, determined using system 100, to a retail location, displaying additional information based on the overlay content, etc.

Figure 3:
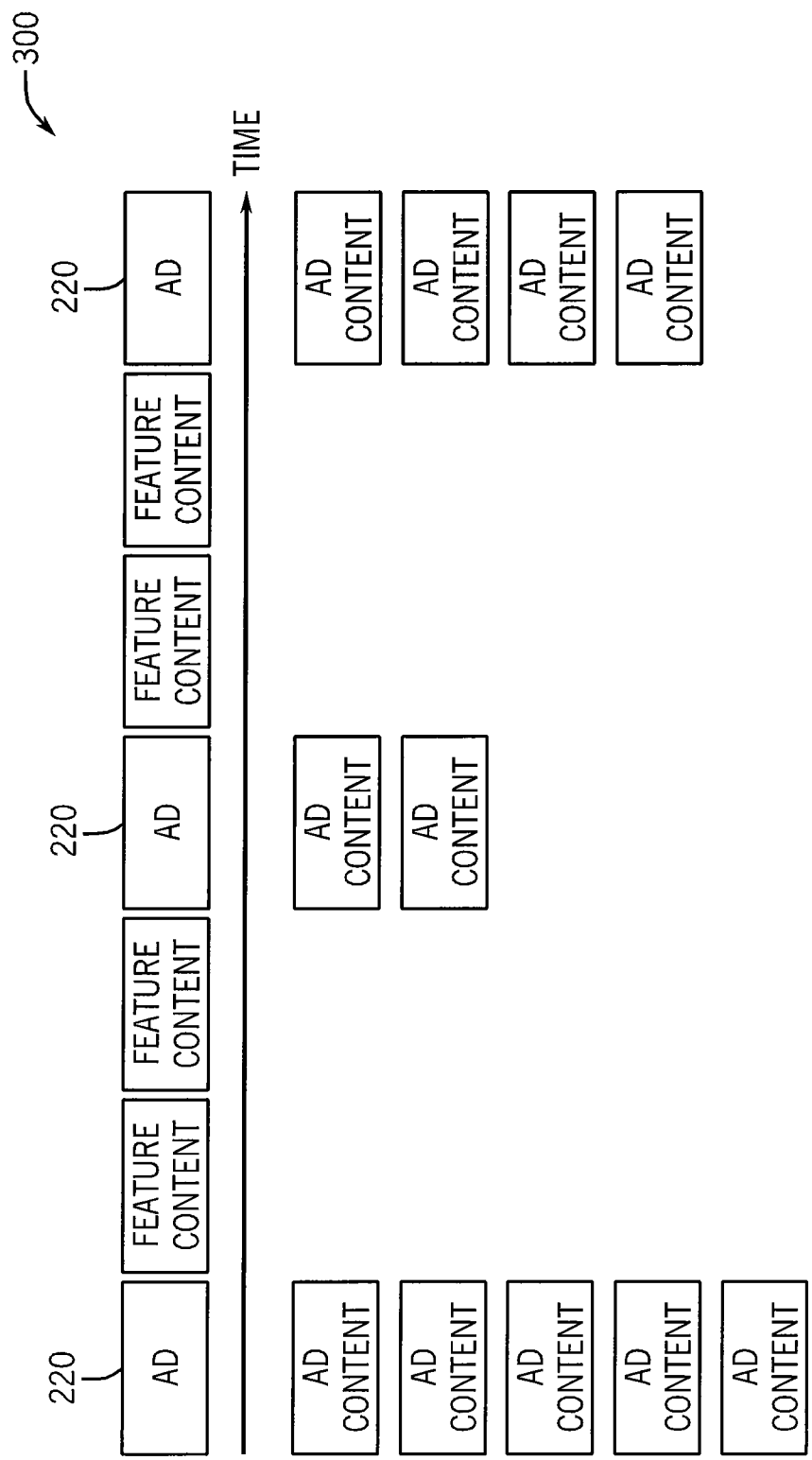
FIG. 3 is a video content playback stream where each insertion point is associated with multiple advertisement events to be selected from based on real-time information, according to an exemplary embodiment.

Referring now to FIG. 3, a video content playback stream 300 where each advertisement event insertion point 220 is associated with multiple advertisements to be selected from based on real-time information, according to an exemplary embodiment. Associating multiple advertisements with each event insertion point 220 allows ad correlation module 125 to determine, in real-time, which of the multiple advertisements will be displayed. The advertisement may be displayed on a rotation basis, based on strength of correlation, etc. The displayed advertising content may be displayed based on a comparison between received playback properties and advertising content target information.

Although shown in FIG. 3 as a video stream 300 including a plurality of advertisements for each event insertion point, video stream 300 may also be implemented including a plurality of potential differing video content for insertion into stream 300. The displayed video content may be selected based on received playback properties.

Figure 4:
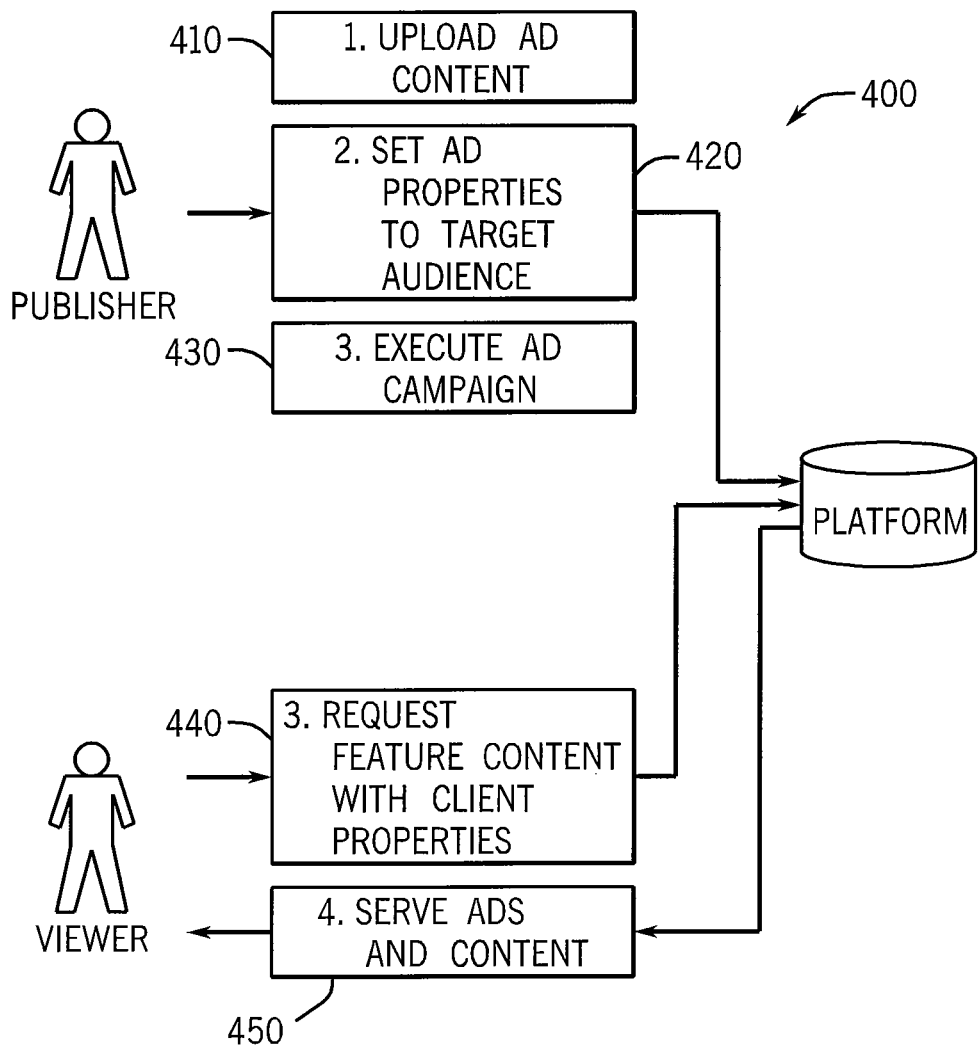
FIG. 4 is a flowchart illustrating a method for providing advertising event content in a video content stream provided to a mobile playback device, according to an exemplary embodiment.

Referring now to FIG. 4, a flowchart 400 illustrating a method for providing advertising content in a video content stream provided to a mobile playback device is shown, according to an exemplary embodiment. The method of flowchart 400 may be implemented using platform engine 123.

In a step 410, an advertising provider may upload advertising content to be stored in database 114. The advertising content may be a video segment, such as a television commercial, web-based applications, a static image to be displayed for a period of time, or any other type of advertising content.

In a step 420, the advertising provider may provide advertising content target information to be associated with the advertising content stored in database 114. The target information may include a target viewer demographic, target geographic information, target timing information, target display device information, target video content type information, and/or any other type of information that the advertising provider wishes to provide that may be used by system 100 to determine the type of mobile devices that will be targeted to receive that specific advertising content.

In a step 430, the advertising provider may indicate that the information provided to system 100 is complete such that the advertising content should be displayed in accordance with the information provided in step 420.

In a step 440, a user of a network enabled mobile device sends a request for video content to system 100 for display on the device. The transmitted request may be configured to include one or more playback properties. Alternatively, device 140 may include a program configured to transmit the information to system 100. The information may be sent at setup, during key points of the video stream, periodically, etc.

In a step 450, the video content and the advertising content is provided by system 100 in a single video stream over network 130 or a plurality of video streams, e.g. a first stream including the video content and at least a second stream including interactive overlay event content. The combined content may be provided to the mobile device as an optimized stream. An optimized stream is formatted for the mobile device based on the characteristics of the mobile device, such as the media player type, supported file types, wireless transmission speeds, etc.

According to one exemplary embodiment, the playback properties may include time information, real-time location GPS information, altitude information, direction of movement, rate of movement, etc. such that engine 123 may, for example, apply known movement patterns, traffic patterns, routes, etc. such as by train, highway, airplane, pedestrian, etc. to determine a potential mode of transportation and eventual destination. For example, engine 123 may determine that device 140 is being used on an airplane based on the above information and determine a predicted destination or future location. The video content and the advertising content may be customized in step 450 based on this information to present video content and the advertising content with a much higher degree of relevancy.

According to another exemplary embodiment, engine 123 may user peer-to-peer communication techniques between devices to infer the location of a device 140 and target content based on the proximity of device 140 to known locations. For example, devices may be placed within a grocery store chain and as the user of device 140 moves along shopping aisles; the video stream may be customized to display marketing videos to the user. Accordingly to another example, an interactive overlay may be displayed in conjunction with the video content to market products.

The provided optimized stream may be modified at any time during the playback of the video content. Since the video content is divided into a plurality of portion in a manifest, advertising events and/or video events may be interchanged at will up to the time that the content is provided over network 130. For example, a user can change the target audience for an advertising content from New York viewers to Chicago viewers. This change will cause removal of the advertising content from playlists of mobile devices that are known to be in New York, and the advertising content will be queued with other advertising content for mobile devices that are known to be in Chicago. Similarly, a user viewing playback on a mobile device when travelling may be presented with advertising content that is specific to the user location at the time the advertisement insertion point is to be provided.

The user of system 100 has the ability to generate video streams using two or more video streams and advertising event insertion points. The publisher can select a video stream as the master stream and insert a new video stream at any point in time within or at the end of the master stream. At each event insertion point the publisher can establish targeting properties for the new stream to ensure only mobile devices targeted for the content are able to view the stream. At each event insertion point one or more streams can be inserted, each with different targeting properties for the mobile devices. For example, the master stream may be a 30 minute comedy show and user of system 100 has sold advertising spots targeting one specific type of mobile device. The sale of the advertising spots entails a promise to show sponsored advertisements at 3 different times during the playback of video content: at the start, end and at the 15 minute mark. Furthermore, the user of system 100 may sell different advertisements for the East Coast and West Coast. In this scenario, the user of system 100 may insert 2 streams at the beginning; middle and end of the feature content each with properties to target the East or West Coast. From a viewer perspective, they would see only 1 of the 2 ads in each of the 3 slots along with the feature content. The playback viewing experience is seamless to the viewer as if they were viewing the feature content on the television.

Although described above with reference to customizing video content, one of ordinary skill in the art should understand that the video content to be inserted may also be customized. For example, a user viewing a video on how to build a deck may receive deck building video content that is customized to their particular location. In other words, the deck building video may be selected from a plurality of deck building videos based on the user's geographic location when viewing the video. For example, the video content may provide different instructions based on local building codes, frost lines, soil types, etc.

Figure 5:
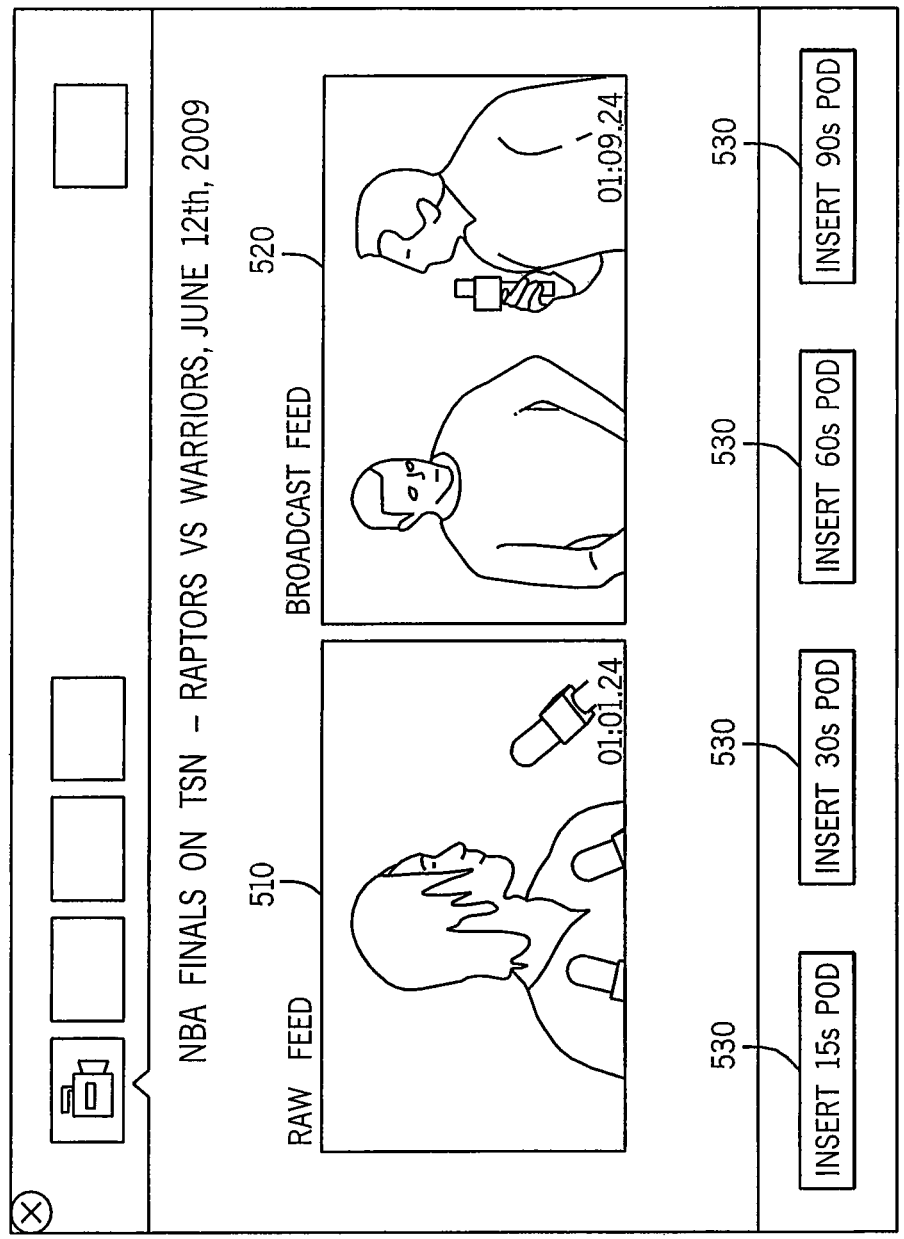
FIG. 5 is an advertisement event insertion interface configured to allow a user of the system of FIG. 1 to insert advertising content into a live video stream being viewed in the interface, according to an exemplary embodiment.

Referring now to FIG. 5, an advertisement event insertion interface 500 configured to allow a user of system 100 insert advertising content into a live video stream being viewed in the interface is shown, according to an exemplary embodiment. Interface 500 may be configured to include a live video feed display 510; a customized video feed display 520, and one or more content insertion buttons 530.

Using interface 500, a user such as a local broadcaster, may use system 100 to insert customized video content to be displayed to viewers of live video feed display 510 in place of the live video feed. For example, a local broadcaster viewing the live video feed in display 510 may desire to insert a local advertisement or a local video content in place of what is being shown in display 510. The local broadcaster may use buttons 530 and/or any other interface to initiate insertion of the customized video content and/or advertisement using the method described above with reference to FIG. 4. Buttons 530 may include different timings as shown in FIG. 5 or may include other customizable controls, such as video frame of a plurality of customized local content, as described above with reference to FIG. 3, allowing the user to select the content to be inserted. The customized video feed may be displayed to the user in display 520.

While the detailed drawings, specific examples and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of renderer, number of mipmap levels, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A non-transitory computer readable medium having instructions stored thereon for a system for generating an optimized video for playback on a mobile device, the optimized video including video events and advertising events selected at the time of playback, comprising:

instructions for a manifest generating module configured to retrieve video content from a content repository for listing in a content manifest in response to a received request from the mobile device, the content manifest being transferred to the mobile device to provide at least temporal instructions on the method of delivery for the content events, and the location of the content to the mobile device and the content manifest including at least one advertisement event insertion point, the content manifest being modifiable only by the manifest generating module of the system;

instructions for an advertising correlation module configured to retrieve one or more advertisements based on a correlation between defined properties of the advertisement and playback properties received from the mobile device, the playback properties including at least location information, indicating where the mobile device is currently located, and user information, the playback properties being received at the advertising correlation module from the mobile device at least when the request is made from the mobile device to the manifest generating module and at least at one other point during playback of the content by the mobile device; and instructions for an advertisement event serving module configured to provide the retrieved one or more advertisements for insertion into the at least one advertisement insertion point such that the retrieved video content events and the retrieved one or more advertisements can be played on the mobile device.

2. The non-transitory computer readable media of claim 1, wherein the playback properties further include a mobile device type for the mobile device.

3. The non-transitory computer readable medium of claim 1, wherein the playback properties further include a current geographic location of the mobile device.

4. The non-transitory computer readable medium of claim 1, wherein the playback properties further include a time of day at the current location of the mobile device.

5. The non-transitory computer readable medium of claim 1, wherein the playback properties further include a user profile generated by a user of the mobile device.

6. The non-transitory computer readable medium of claim 1, wherein the advertising correlation module is configured to determine the advertisements to be provided at the time the advertisements are to be transmitted to the mobile device in accordance with the playback properties most recently received from the mobile device.

7. The non-transitory computer readable medium of claim 6, wherein the advertising correlation module is configured to periodically request updates to the playback properties from the mobile device during a transmission of the optimized video.

8. The non-transitory computer readable medium of claim 6, wherein the retrieved one or more advertisements comprise interactive overlay events to be displayed contemporaneously with the video content.

9. The non-transitory computer readable medium of claim 1 wherein the playback properties further include an identification of the formats of media that can be played by the mobile device and wherein the manifest generating module creates a manifest which identifies the location of the requested video content and the retrieved one or more advertisements in at least one of the identified formats.

10. A computer-implemented method for generating an optimized video for playback on a mobile device, the optimized video including video content and advertising content selected at the time of playback, comprising the steps of:
retrieving video content from a computer-implemented content repository for listing in a content manifest in response to a received request from a mobile device, the content manifest being transferred to the mobile device to provide at least temporal instructions on the method of delivery for the content events and the content manifest not being modifiable by the mobile device, and the location of the content to the mobile device and the content manifest including at least one advertisement event insertion point;
retrieving one or more advertisements based on a correlation between one or more predefined properties of the advertisement and one or more playback properties received from the mobile device, the playback properties including at least location information indicating where the mobile device is currently located, and user information, the playback properties being received from the mobile device at least when the request is made from the mobile device and at least at one other point during playback of the content by the mobile device;
providing the retrieved one or more advertisements for insertion into the at least one advertisement event insertion point; and transmitting the content manifest of a wireless network to the mobile device such that the mobile device can play the optimized video.

11. The method of claim 10, wherein the playback properties further include a mobile device type for the mobile device.

12. The method of claim 10, wherein the playback properties further include a current geographic location of the mobile device.

13. The method of claim 12, wherein the playback properties further include one or more movement characteristics of the mobile device and further including the step of generating a predicted destination of the mobile device based on the playback properties and wherein retrieving one or more advertisements based on a correlation between advertisement properties and playback properties includes retrieving the one or more advertisements based on the predicted destination.

14. The method of claim 10, wherein the playback properties further include a user profile generated by a user of the mobile device.

15. The method of claim 10, wherein providing the retrieved one or more advertisements for insertion into the at least one advertisement event insertion point includes determining the advertisements to be provided at the time the advertisements are to be transmitted to the mobile device in accordance with the playback properties most recently received from the mobile device.

16. The method of claim 15, further including periodically requesting updates to the playback properties from the mobile device during a downloading of the optimized video stream by the mobile device.

17. The method of claim 10 wherein the playback properties further include an identification of the formats of media that can be played by the mobile device and wherein the manifest identifies the location of the requested video content and the retrieved one or more advertisements in at least one of the identified formats.

18. A non-transitory computer readable medium having instructions stored thereon for a system for generating an optimized video for playback on a mobile device including video content and advertising content selected at the time of playback, comprising instructions for:
a manifest generating module configured to retrieve video content from a content repository for listing in a content manifest in response to a received request from the mobile device, the content manifest being modifiable only by the manifest generating module of the system and the content manifest being transferred to the mobile device to provide at least temporal instructions on the method of delivery for the content events, and the location of the content to the mobile device and the content manifest including at least one advertisement insertion point;
an advertisement serving module configured to provide advertisement content for insertion into the at least one advertisement insertion point, wherein the advertising serving module receives a set of playback properties from the mobile device, the playback properties including at least location information, indicating where the mobile device is currently located, and user information, the playback properties being received at the advertising serving module at least when the request is made from the mobile device and at least at one other point during playback of the content by the mobile device and at least one of the video content and the advertisement content is selected based on a correlation between the content and the received playback properties.

19. The non-transitory computer readable medium of claim 18, wherein the playback properties further include a mobile device type for the mobile device.

20. The non-transitory computer readable medium of claim 18, wherein the playback properties further include a current geographic location of the mobile device.

21. The non-transitory computer readable medium of claim 18, wherein the playback properties further include a time of day at the mobile device.

22. The non-transitory computer readable medium of claim 18, wherein the playback properties further include a user profile generated by a user of the mobile device.

23. The non-transitory computer readable medium of claim 18 wherein the playback properties further include an identification of the formats of media that can be played by the mobile device and wherein the manifest generating module creates a manifest which identifies the location of the requested video content and the retrieved one or more advertisements in at least one of the identified formats.

* * * * *